(12) United States Patent
Hopper et al.

(10) Patent No.: US 8,264,736 B2
(45) Date of Patent: Sep. 11, 2012

(54) VARIABLE DATA PRINT VERIFICATION MECHANISM

(75) Inventors: Samuel Neely Hopper, Longmont, CO (US); Brian Paul Doyle, Boulder, CO (US)

(73) Assignee: InfoPrint Solutions Company LLC, Boulder, CO (US)

( * ) Notice: Subject to any disclaimer, the term of this patent is extended or adjusted under 35 U.S.C. 154(b) by 658 days.

(21) Appl. No.: 12/499,901

(22) Filed: Jul. 9, 2009

(65) Prior Publication Data
US 2011/0007343 A1      Jan. 13, 2011

(51) Int. Cl.
*G06K 15/00* (2006.01)
(52) U.S. Cl. ...................... 358/1.18; 358/1.12
(58) Field of Classification Search .................. 358/1.12, 358/1.18
See application file for complete search history.

(56) References Cited

U.S. PATENT DOCUMENTS

| | | | |
|---|---|---|---|
| 5,616,911 A * | 4/1997 | Jagielinski | 235/493 |
| 6,199,765 B1 | 3/2001 | Uhling | |
| 6,305,604 B1 * | 10/2001 | Ono | 235/380 |
| 6,390,362 B1 * | 5/2002 | Martin | 235/379 |
| 6,924,906 B1 | 8/2005 | Schwier et al. | |
| 7,066,669 B2 | 6/2006 | Lugg | |
| 7,099,029 B2 | 8/2006 | Hopper | |
| 7,108,183 B1 | 9/2006 | Cox, Jr. | |
| 7,226,158 B2 | 6/2007 | Moore et al. | |
| 2002/0012134 A1 | 1/2002 | Calaway | |
| 2002/0054337 A1 | 5/2002 | Makishima et al. | |
| 2002/0191208 A1 | 12/2002 | Uemura et al. | |
| 2003/0133139 A1 | 7/2003 | Robinson et al. | |
| 2004/0066527 A1 | 4/2004 | Kloosterman et al. | |
| 2005/0151995 A1 | 7/2005 | Hauser et al. | |
| 2006/0114500 A1 | 6/2006 | Ha | |
| 2006/0238793 A1 | 10/2006 | Akashi et al. | |
| 2006/0291018 A1 | 12/2006 | Lang et al. | |
| 2007/0022053 A1 * | 1/2007 | Waserstein et al. | 705/42 |
| 2007/0024882 A1 | 2/2007 | Hoffman et al. | |
| 2007/0053004 A1 | 3/2007 | Calaway | |
| 2007/0076234 A1 | 4/2007 | Hopper et al. | |
| 2007/0098262 A1 | 5/2007 | Malik et al. | |
| 2007/0120933 A1 | 5/2007 | Mueller | |
| 2008/0074707 A1 | 3/2008 | Cranitch et al. | |

FOREIGN PATENT DOCUMENTS

| | | |
|---|---|---|
| EP | 0802527 | 10/1997 |
| EP | 1587018 | 10/2005 |

OTHER PUBLICATIONS

Matsumoto, Takeshi, et al., "Development and Verification of a Collaborative Printing Environment", *0-7695-2806-6/07; Creating, Connecting and Collaborating through Computing*, 2007. C5 '07. The Fifth International Conference., (Jan. 2007), 8 pages.
"European Search Report", 10167382.0-2210, (Aug. 23, 2010), 6 pages.

* cited by examiner

*Primary Examiner* — Twyler Haskins
*Assistant Examiner* — Fred Guillermety
(74) *Attorney, Agent, or Firm* — Blakely, Sokoloff, Taylor & Zafman LLP

(57) ABSTRACT

A printing system is disclosed. The printing system includes a first printer to print a first type of data to a medium and to print a first barcode on the medium including variable to be printed on the medium and a second printer to print the variable data to the medium based on the first barcode and to print a second barcode to the medium for verification that the variable data has been accurately printed to the medium.

23 Claims, 3 Drawing Sheets

VARIABLE DATA PRINT VERIFICATION MECHANISM

FIELD OF THE INVENTION

The invention relates to the field of printing, and in particular, to verification of variable data on printed documents.

BACKGROUND

In the printing industry, it is sometimes necessary to process media multiple times in order to create a final product. For example, media such as paper may be pre-printed in an offset press, then run through a digital press/printer in order to add unique (variable) information. In other instances, a digital printer may not have enough capability (e.g., an ink jet printer may not be able to print Magnetic Ink Character Recognition (MICR), or a monochrome printer may not be able to print color/highlight color).

In these cases, it may be necessary to process the media through multiple, independent digital printing devices in order to achieve the final product. To highlight their independence, the printing devices may be located in different buildings or countries and having no external network connection. Thus, the printed output may be processed hours or days apart.

When the independent printing systems are generating variable data (e.g., print data changes frequently and is very specific and personal to each piece of media), it is critical that each of the independent systems apply the correct data to the media. For example, the media may be processed in the first printer to apply a name and address in color, then processed in a different printer to add MICR data to be used by a banking system. Therefore, it is extremely important that the variable data printed by the two independent printing systems is matched correctly.

In many instances, there is no way of verifying the output of the second printer to determine if the second printer performed correctly. For example, the second printer may have printed a bank account number in MICR, but there is no way to verify that the printed account number matches the account holder's name that was printed by the first printer?

Accordingly, a mechanism to verify the accuracy of data printed from the second printer is desired.

SUMMARY

In one embodiment, a printing system is disclosed. The printing system includes a first printer to print a first type of data to a medium and to print a first barcode on the medium including variable data and a second printer to print the variable data to the medium based on the first barcode and to print a second barcode to the medium for verification that the variable data has been accurately printed to the medium.

In a further embodiment, a method is disclosed including reading a first barcode printed on a medium including variable data, printing the variable data to the medium based on the first barcode, generating a second barcode from the variable data included in the first barcode and printing the second barcode to the print medium.

In another embodiment, a printer is disclosed. The printer includes a control unit to read a first barcode printed on a medium including variable data, print the variable data to the medium based on the first barcode, generate a second barcode from the variable data included in the first barcode and print the second barcode to the print medium.

BRIEF DESCRIPTION OF THE DRAWINGS

A better understanding of the present invention can be obtained from the following detailed description in conjunction with the following drawings, in which.

DETAILED DESCRIPTION

A printer verification mechanism is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
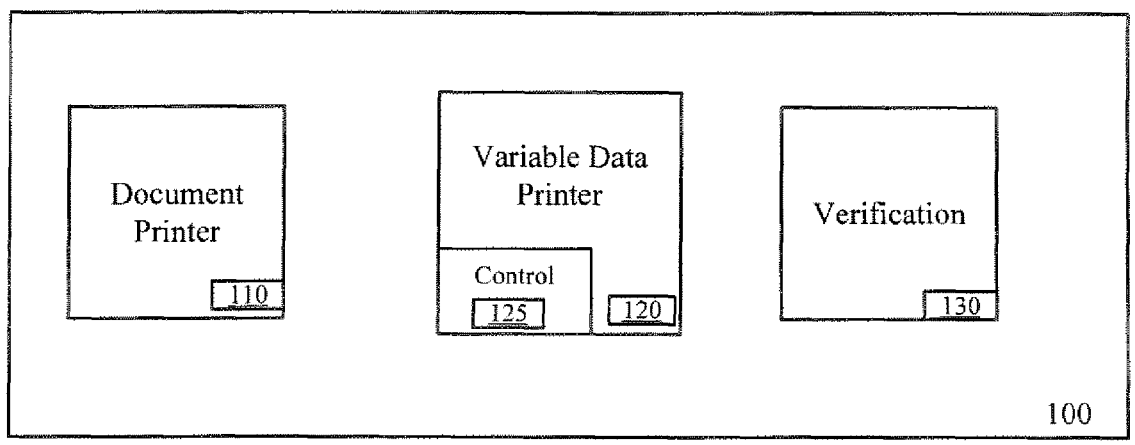
FIG. 1 illustrates one embodiment of a printing system.

FIG. 1 illustrates one embodiment of a printing system 100. Printing system 100 includes a document printer 110, a variable data printer 120 and a verification mechanism 130. According to one embodiment, printer 110 is a high speed ink jet color printer that is implemented to print image and text data on paper.

In a further embodiment, printer 110 prints the images and text data on check stock for a multitude of bank account holders. For example, printer 110 may print the address, phone number and other account holder specific data, along with one or more selected images, on each check that is printed. However, printer 110 does not have the capability to print other variable data, such as MICR. Thus, the variable data is to be printed at variable printer 120.

In one embodiment, printer 110 prints a barcode on each document. Within the barcode data printed on the first printing system is all of the instructions to print the variable data on the second, independent printing system. In such an embodiment, the barcode includes the variable data (e.g., bank account numbers) that is to be applied to the document at printer 120 since the variable data may be printed on the document an indefinite amount of time after being processed at printer 110. In a further embodiment, the data within the barcode is encrypted since the data may include confidential or sensitive information.

Figure 2:
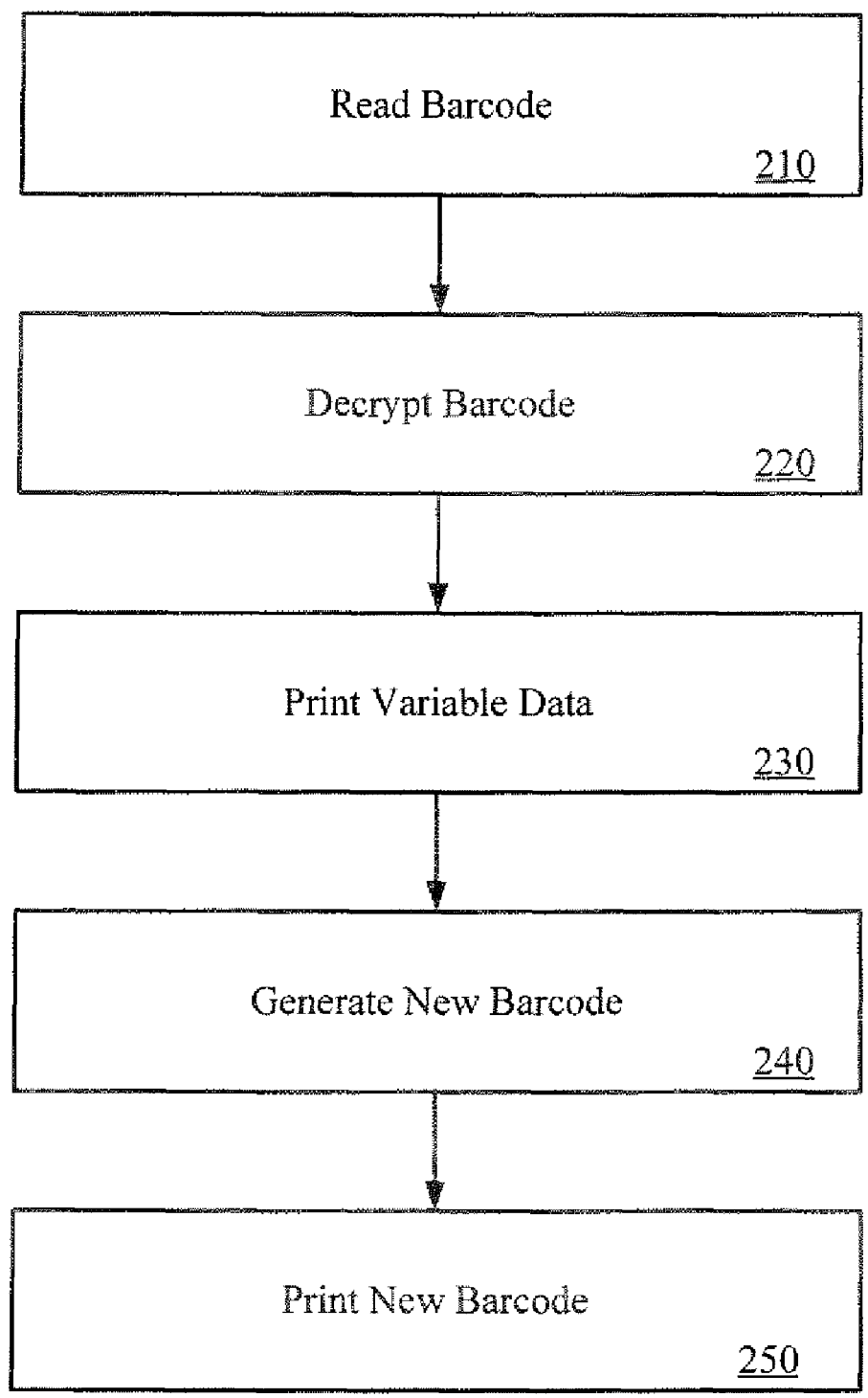
FIG. 2 is a flow diagram illustrating one embodiment of the operation of a printer.

At some later time the document is placed into printer 120 for printing of the variable data. According to one embodiment, printer 120 is a monochrome printer equipped with MICR toner. FIG. 2 is a flow diagram illustrating one embodiment of a process performed by a control unit 125 within printer 120. At processing block 210, printer 120 reads the barcode on the document.

At processing block 220, the barcode data is decrypted. At processing block 230, the variable data is printed onto the document. At processing block 240, the decrypted barcode data is used to generate a second barcode identical to the original barcode. Thus, the information is again encrypted prior to generating the barcode. At processing block 250, the second barcode is printed on the document. In one embodiment, the second barcode is printed in a known position on the document relative to the original barcode.

Figure 3:
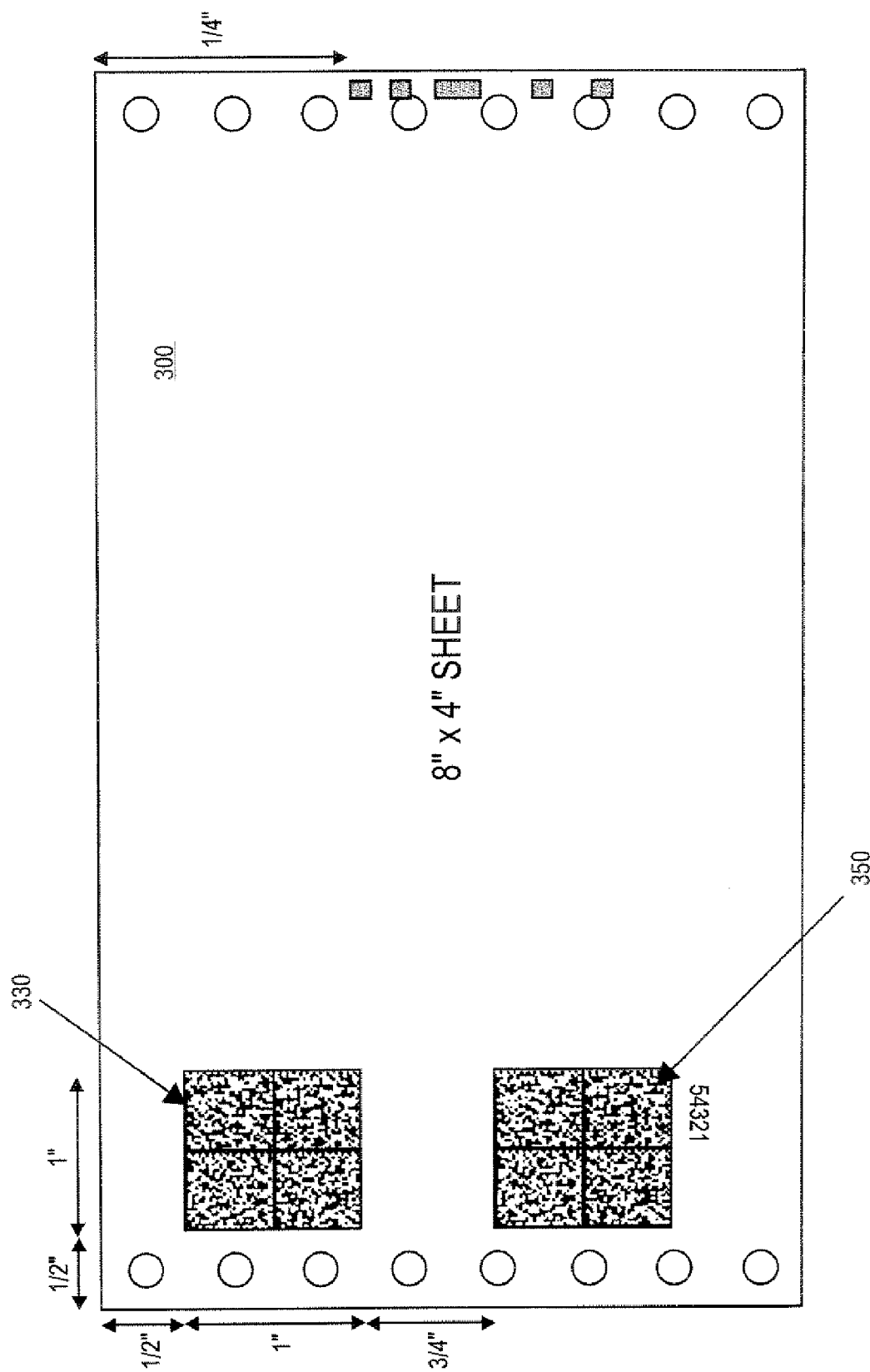
FIG. 3 illustrates one embodiment of a document.

FIG. 3 illustrates one embodiment of a document 300 after it has been processed at printer 120. Document 300 includes a barcode 330 that was printed at printer 110 and an identical barcode 350 printed at printer 120. The document is later received at verification mechanism 130 where the second barcode is compared to the original barcode to verify that the proper variable data was printed on the document.

According to one embodiment, verification mechanism 130 is a barcode scanner that has the capability of comparing the two barcodes once each is read. However in other embodiments, the scanner may transmit the scanned data to a controller that handles the comparison. A match between barcodes indicates that the printer 120 was successful in reading and decrypting the data in the original barcode. In one embodiment, verification mechanism 130 may be an independent verification device that needs no special programming or knowledge of the variable data or encryption to provide verification.

Further, by placing the second barcode on the same piece of media (e.g., paper) there is an indication that the variable data printed by the second printer corresponds correctly to the variable data applied by the first printer. In one embodiment, verification mechanism 130 is configured to expect a pair of identical barcodes in close proximity relative to the media size (page). If, after the comparison, it is determined that the barcodes do not match or one of the barcodes is missing, the document is discarded or forwarded for further verification.

According to one embodiment, a human readable representation (e.g. unique serial number) included within the barcode data may also be printed on the document at printer 110, in addition to the barcode. In this embodiment, a second version of the serial number is also printed on the document at printer 120 after the barcode is decrypted. This allows for the comparison of two printed numbers after the document is processed at printer 120, rather than comparing barcodes. In such an embodiment, verification mechanism 130 may include an image authentication system to compare the printed numbers.

Although described with reference to a single document pages, the above-described process may be implemented in embodiments where barcodes printed on each of multiple pages of a single document are verified to ensure that each page has accurate data.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A printing system comprising:
a first printer to print a first type of data to a medium and to print a first barcode on the medium including variable data to be printed on the medium;
a second printer to print the variable data to the medium based on the first barcode and to print a second barcode to the medium for verification that the variable data has been accurately printed to the medium; and
a verification system to verify that the second barcode is identical to the first barcode.

2. The printing system of claim 1 wherein the first printer encrypts the variable data prior to printing the first barcode.

3. The printing system of claim 1 wherein the second printer decrypts the variable data from the first barcode prior to printing the variable data to the medium.

4. The printing system of claim 3 wherein the second printer encrypts the data from the first barcode prior to printing the second barcode.

5. The printing system of claim 3 wherein the second barcode is printed in a known position on the medium relative to the first barcode.

6. The printing system of claim 1 wherein the verification system compares the second barcode to the first barcode.

7. The printing system of claim 1 wherein the verification system is a scanner.

8. The printing system of claim 1 wherein the first type of data comprises at least one of text data and image data.

9. A method comprising:
reading a first barcode printed on a medium including variable data;
printing the variable data to the medium based on the first barcode;
generating a second barcode from the variable data included in the first barcode;
printing the second barcode to the print medium; and
verifying that the second barcode is identical to the first barcode.

10. The method of claim 9 further comprising decrypting the variable data from the first barcode prior to printing the variable data to the medium.

11. The method of claim 9 further comprising encrypting the variable data from the first barcode prior to generating the second barcode.

12. The method of claim 9 wherein the second barcode is printed in a known position on the medium relative to the first barcode.

13. The method of claim 9 further comprising comparing the second barcode to the first barcode.

14. A printer comprising a control unit to read a first barcode printed on a medium including variable data, print the variable data to the medium based on the first barcode, generate a second barcode from the variable data included in the first barcode, print the second barcode to the print medium and verify that the second barcode is identical to the first barcode.

15. The printer of claim 14 wherein the control unit further decrypts the variable data from the first barcode prior to printing the variable data to the medium.

16. The printer of claim 14 wherein the control unit further encrypts the variable data from the first barcode prior to generating the second barcode.

17. The printer of claim 14 wherein the second barcode is printed in a known position on the medium relative to the first barcode.

18. The printer of claim 14 wherein the control unit compares the second barcode to the first barcode.

19. An article of manufacture comprising a machine-readable medium including data that, when accessed by a machine, cause the machine to perform operations comprising:

reading a first barcode printed on a medium including variable data;

printing the variable data to the medium based on the first barcode;

generating a second barcode from the variable data included in the first barcode;

printing the second barcode to the print medium; and verifying that the second barcode is identical to the first barcode.

20. The article of manufacture of claim 19 wherein the machine-accessible medium includes data that causes the machine to perform further operations comprising decrypting the variable data from the first barcode prior to printing the variable data to the medium.

21. The article of manufacture of claim 19 wherein the machine-accessible medium includes data that causes the machine to perform further operations comprising encrypting the variable data from the first barcode prior to generating the second barcode.

22. The article of manufacture of claim 19 wherein the second barcode is printed in a known position on the medium relative to the first barcode.

23. The article of manufacture of claim 19 wherein the machine-accessible medium includes data that causes the machine to perform further operations comprising comparing the second barcode to the first barcode.

* * * * *